(12) United States Patent
Schwartz et al.

(10) Patent No.: US 8,636,519 B2
(45) Date of Patent: Jan. 28, 2014

(54) SIMULATION OF AN INVASIVE PROCEDURE

(75) Inventors: Yitzhack Schwartz, Haifa (IL); Natan Katz, Kiryat Bialik (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 262 days.

(21) Appl. No.: 12/897,828

(22) Filed: Oct. 5, 2010

(65) Prior Publication Data
US 2012/0082969 A1 Apr. 5, 2012

(51) Int. Cl.
*G09B 23/28* (2006.01)
(52) U.S. Cl.
USPC ............................ 434/262; 434/266; 434/267
(58) Field of Classification Search
USPC .................................................. 434/262–275
See application file for complete search history.

(56) References Cited

U.S. PATENT DOCUMENTS

| 5,704,791 | A * | 1/1998 | Gillio ............................ 434/262 |
| 5,800,178 | A | 9/1998 | Gillio |
| 5,800,179 | A * | 9/1998 | Bailey ........................... 434/262 |
| 6,695,808 | B2 * | 2/2004 | Tom ................................. 604/65 |
| 7,249,951 | B2 * | 7/2007 | Bevirt et al. .................. 434/262 |
| 7,505,030 | B2 * | 3/2009 | Cunningham et al. ........ 345/156 |
| 2001/0002126 | A1 * | 5/2001 | Rosenberg et al. ........... 345/156 |
| 2002/0137014 | A1 | 9/2002 | Anderson et al. |
| 2002/0168618 | A1 | 11/2002 | Anderson et al. |
| 2004/0034283 | A1 * | 2/2004 | Quaid, III ..................... 600/300 |
| 2006/0046235 | A1 * | 3/2006 | Alexander et al. ............ 434/262 |
| 2006/0234195 | A1 * | 10/2006 | Grund-Pedersen et al. .. 434/262 |
| 2007/0032826 | A1 | 2/2007 | Schwartz |
| 2007/0043285 | A1 | 2/2007 | Schwartz |
| 2007/0139375 | A1 * | 6/2007 | Rosenberg et al. ........... 345/161 |
| 2007/0225593 | A1 * | 9/2007 | Porath et al. .................. 600/423 |
| 2008/0020362 | A1 * | 1/2008 | Cotin et al. ................... 434/267 |
| 2009/0076476 | A1 * | 3/2009 | Barbagli et al. .............. 604/500 |
| 2009/0093806 | A1 * | 4/2009 | Govari et al. ................... 606/34 |
| 2009/0130643 | A1 * | 5/2009 | Cusano ......................... 434/262 |
| 2009/0203992 | A1 * | 8/2009 | Govari et al. ................. 600/424 |
| 2010/0160770 | A1 | 6/2010 | Govari et al. |

FOREIGN PATENT DOCUMENTS

| WO | WO 95/02233 A1 | 1/1995 |
| WO | WO 98/03954 A1 | 1/1998 |

OTHER PUBLICATIONS

Extended European Search Report dated Mar. 13, 20012 from related application No. 11183764.7.

* cited by examiner

*Primary Examiner* — Kathleen Mosser
*Assistant Examiner* — Thomas Hong

(57) ABSTRACT

Apparatus, including: a mockup probe, having a distal end and a proximal end adapted to be held by a human operator. The apparatus further includes a mockup patient, simulating an actual patient, the mockup patient having an aperture allowing penetration of the distal end of the mockup probe into the mockup patient. The apparatus includes a force generator, coupled to the mockup probe so as to apply a force to the proximal end that can be felt by the human operator, and a system controller. The controller is configured to: track a location of the distal end during the penetration thereof into the mockup patient, access an indication of a value of contractility of a region of an organ of the actual patient corresponding to the location, and activate the force generator so that the force applied to the proximal end corresponds to the indication.

30 Claims, 7 Drawing Sheets

SIMULATION OF AN INVASIVE PROCEDURE

FIELD OF THE INVENTION

The present invention relates generally to invasive medical devices, and specifically to simulation of such procedures.

BACKGROUND OF THE INVENTION

There is typically a learning curve associated with any medical procedure, and depending on the procedure, the learning curve may in some cases be relatively "steep." Even where learning curves are not steep, there is typically a not inconsiderable time period involved in learning and perfecting the procedure. Having the ability to simulate the procedure may reduce the time period.

U.S. Patent Application 2007/0043285, to Schwartz, whose disclosure is incorporated herein by reference, describes a method for pre-planning and performing a cardiac procedure on a heart. The method includes simulating insertion of a sheath into the heart and simulating insertion of a medical device through the sheath and within the heart.

U.S. Patent Application 2007/0032826, to Schwartz, whose disclosure is incorporated herein by reference, describes a method for treating atrial fibrillation in an atrium of a heart. The method has some similarities the method of application 2007/0043285, including simulating insertion of a sheath into the atrium and simulating insertion of a medical device through the sheath and into the atrium.

The description above is presented as a general overview of related art in this field and should not be construed as an admission that any of the information it contains constitutes prior art against the present patent application.

SUMMARY OF THE INVENTION

There is provided, according to an embodiment of the present invention, apparatus, including:

a mockup probe, having a distal end and a proximal end adapted to be held by a human operator;

a mockup patient, simulating an actual patient, the mockup patient having an aperture allowing penetration of the distal end of the mockup probe into the mockup patient;

a force generator, coupled to the mockup probe so as to apply a force to the proximal end that can be felt by the human operator; and a system controller, which is configured to:

track a location of the distal end during the penetration thereof into the mockup patient, access an indication of a value of contractility of a region of an organ of the actual patient corresponding to the location, and activate the force generator so that the force applied to the proximal end corresponds to the indication.

Typically, the system controller is configured to access a probe parameter indicative of a mechanical property of an actual probe which is simulated by the mockup probe, and the force applied to the proximal end is responsive to the probe parameter. A value of the probe parameter may be determined in response to an evaluation of the force felt by the human operator.

The system controller may be configured to access an operator parameter indicative of a style of operation of the human operator, and the force applied to the proximal end may be responsive to the operator parameter. The operator parameter may be determined in response to a recording of the location of the distal end and a time at the location.

In one embodiment the system controller is configured to determine the value of the contractility in response to analysis of at least one of a contact-force map of the organ and an image of the organ. The contact-force map may be produced using an actual probe comprising a force sensor. The image may be produced using non-invasive imaging of the organ.

In a disclosed embodiment the mockup probe is configured to simulate an actual probe having an actual-probe distal end and comprising a force sensor at the actual-probe distal end.

In an alternative embodiment the apparatus includes one or more tracking devices which transmit distal end tracking signals to the system controller in response to the location of the distal end.

There is further provided, according to an embodiment of the present invention, a method, including:

providing a mockup probe, having a distal end and a proximal end adapted to be held by a human operator;

simulating an actual patient with a mockup patient, the mockup patient having an aperture allowing penetration of the distal end of the mockup probe into the mockup patient;

coupling a force generator to the mockup probe so as to apply a force to the proximal end that can be felt by the human operator;

tracking a location of the distal end during the penetration thereof into the mockup patient;

accessing an indication of a value of contractility of a region of an organ of the actual patient corresponding to the location; and activating the force generator so that the force applied to the proximal end corresponds to the indication.

The present invention will be more fully understood from the following detailed description of the embodiments thereof, taken together with the drawings in which:

DETAILED DESCRIPTION OF EMBODIMENTS

Overview

An embodiment of the present invention allows an operator, typically a medical professional such as a physician, to operate a system simulating an invasive procedure of a body organ that uses an actual catheter probe. The organ is herein assumed to comprise a lumen, and typically the catheter probe comprises a force sensor which measures a contact-force of a distal end of the probe with the lumen.

The operator typically selects the lumen and the probe to be used in the simulated procedure on the lumen. On selection of the lumen, a system controller accesses a three-dimensional (3D) map of the lumen, as well as contractility data of regions of the lumen. The operator holds a proximal end of a mockup probe, and inserts the mockup probe into an aperture of a mockup patient. During the insertion, locations of a distal end of the mockup probe, within the mockup patient, are tracked. The system includes a force generator that applies a force that is felt by an operator holding the proximal end of the mockup probe.

When a controller of the system determines that a location of the distal end of the mockup probe corresponds to a region of the wall of the lumen (using the 3D map), the controller activates the force generator to apply a haptic feedback force on the proximal end of the mockup probe. The force applied is a function of the contractility of the region. The force is also typically a function of the type of probe being simulated by the mockup probe, as well as of a style of operation of the operator.

For actual probes comprising a force sensor, the operator may be shown an estimated value of a force measured by the sensor, while the force from the force generator is being applied. Such probes are described, for example, in US Patent Applications 2009/0093806 and 2010/0160770, which are assigned to the assignee of the present invention and which are incorporated herein by reference. The two "feedbacks" to the operator—the force value and the haptic feedback force—enable the operator to relate and to learn, from the simulation, how the value of the force measured by the sensor compares with the force felt by the operator during an actual procedure.

In addition, for probes comprising a force sensor, the simulation enables the operator to elucidate regions of a mapped chamber where, given a certain operator mapping style and a selected catheter probe with known mechanics, effective contact (which may be defined as the contact necessary to generate a transmural therapeutic ablation) may not be achieved. In this event the operator may amend a therapeutic plan (involving spatial location of the ablation points or lines), adjust the mapping style and/or replace the chosen probe. Similarly, identifying beforehand hazardous regions where excessive contact force is highly foreseeable enables defining 'no-flying zones' and safer catheter probe manipulations. In all cases, the operator may use the system to check an altered procedure.

DETAILED DESCRIPTION

Figure 1:
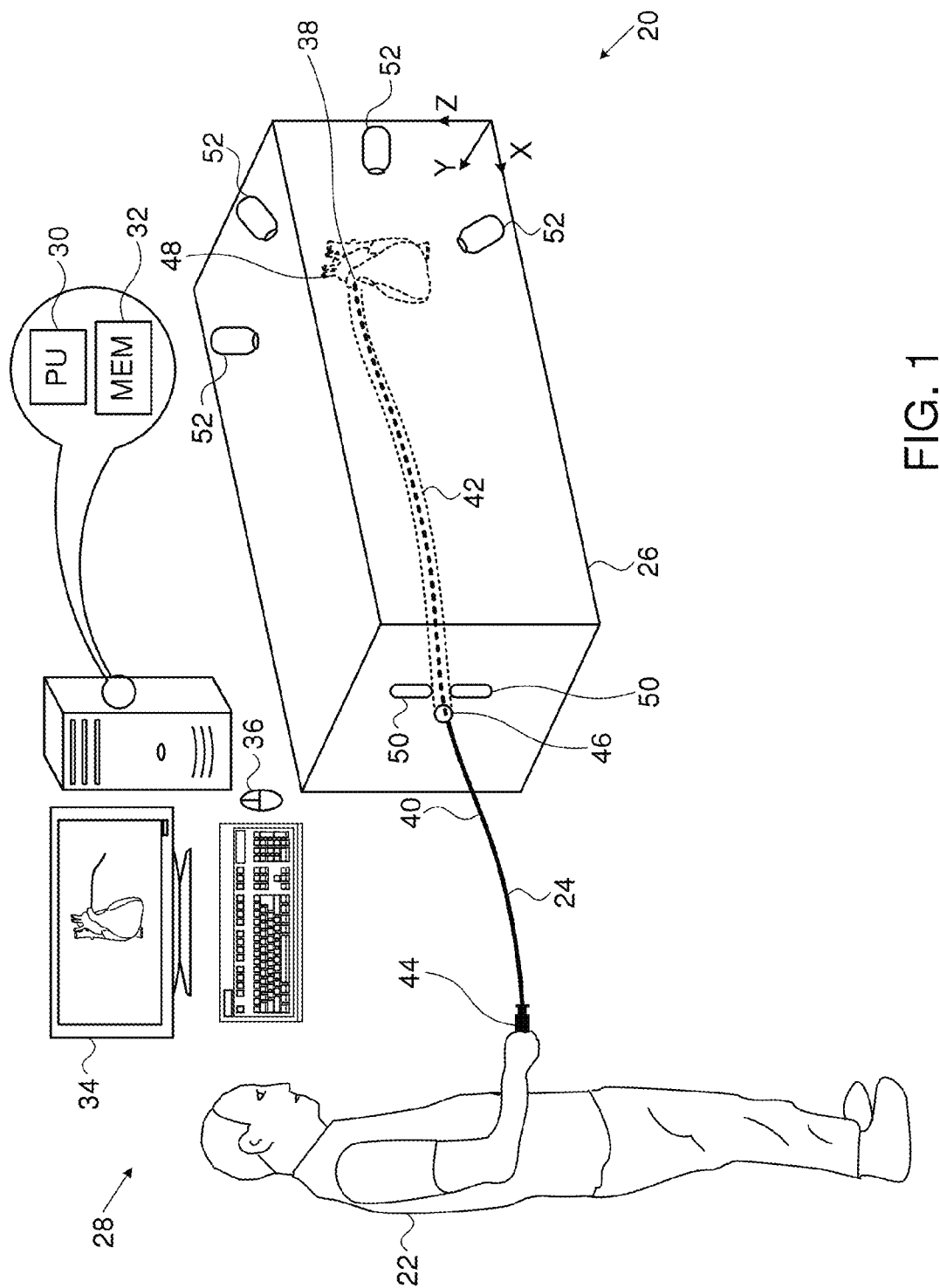
FIG. 1 which is a schematic diagram illustrating a simulation system, according to an embodiment of the present invention.

Reference is now made to FIG. 1, which is a schematic diagram illustrating a simulation system 20, according to an embodiment of the present invention. System 20 allows a human operator 22 of the system, typically a medical professional such as a physician, to perform a simulation of an invasive medical procedure. In the actual medical procedure, the operator inserts a catheter probe into a body organ, herein assumed to comprise a lumen, and manipulates a distal end of the probe using controls at the proximal end of the catheter. In the description hereinbelow, the body lumen of the actual procedure is typically assumed to comprise the heart of a patient. However, it will be understood that this actual procedure is by way of example, and other medical procedures that system 20 may simulate will be apparent to those having ordinary skill in the art. Such procedures and their simulations are assumed to be comprised within the scope of the present invention.

In simulation system 20 a mockup probe 24 is used instead of the "real" probe of the actual procedure, and the mockup probe is inserted into a mockup patient 26, which replaces the actual patient of the actual procedure. Herein, by way of example, mockup patient 26 is assumed to have a box-like shape. However, the mockup patient may have any convenient shape, including a shape that is more human-like.

System 20 is typically used to teach aspects of functioning of real probes, without operator 22 having to perform an actual procedure. Herein, the real probes are assumed to have at their distal tip a force sensor which measures a force generally parallel to the axis of the probe. The simulations described herein enable the operator performing the simulations to learn about the functionality of the force sensor by providing, inter alia, haptic feedback to the operator while at the same time simulating readings of the force sensor. However, the aspect of learning the functionality of a force sensor is assumed herein for simplicity and clarity, so that embodiments of the present invention can be adapted, mutatis mutandis, to teach other aspects of probes, such as teaching the functionality of a temperature sensor, for example by providing haptic feedback during a simulated ablation procedure. All such aspects are assumed to be comprised within the present invention.

During an actual procedure, operator 22 typically uses more than one actual probe, each of the different probes having different features such as characteristic shapes or differing numbers of electrodes. In the simulations described herein, the operator may also use more than one mockup probe 24. For clarity, as necessary and where more than one mockup probe is being used, the different mockup probes may be differentiated by having a letter appended to the identifier 24, so that in a simulation of a procedure using two actual probes, the operator may use mockup probe 24A and mockup probe 24B.

The functioning of system 20 is managed by a system controller 28, comprising a processing unit 30 communicating with a memory 32, wherein is stored software for operation of system 20. Controller 28 is typically an industry-standard personal computer comprising a general-purpose computer processor. However, in some embodiments, at least some of the functions of the controller are performed using custom-designed hardware and software, such as an application specific integrated circuit (ASIC) and/or a field programmable gate array (FPGA). Communication between system controller 28 and elements of system 20, comprising signals between the controller and the elements, may be by a physical cable such as a conductive or optical cable, and/or by wireless. For simplicity, elements of system 20 concerned with the communication are not shown in FIG. 1.

The software in memory 32 may be downloaded to the controller in electronic form, over a network, for example. Alternatively or additionally, the software may be provided on non-transitory tangible media, such as optical, magnetic, or electronic storage media.

System controller 28 operates a graphic user interface (GUI) 34, which presents results generated by the system to operator 22. GUI 34 also enables the operator to choose various options in setting up a simulation. Typically, the operator interacts with controller 28 and GUI 34 using a pointing device 36, such as a trackball or a mouse.

Within mockup patient 26 operator 22 is able to maneuver a distal end 38 of mockup probe 24 by holding and manipulating a proximal end 40 of the mockup probe. Typically, a resilient tube 42, supported by a material such as fiberglass or polystyrene pellets, is placed within mockup patient 26 to simulate a vein or artery of an actual patient. Tube 42 acts as a support and a guide for the mockup probe, while not unduly impeding forward or backward motion of the probe. Typically, the operator uses a handle 44 to hold the mockup probe, as she/he would typically hold a real probe during an actual medical procedure. The operator manipulation typically also includes other motions such as transverse and rotational movements of the proximal end to generate corresponding maneuvers of the distal end.

The manipulation of the proximal end includes insertion, via an aperture 46 in the mockup patient which connects to tube 42, of the mockup probe into a mockup body lumen 48 situated in the distal region of the mockup patient. (The manipulation also includes removal of the mockup probe via the same aperture.)

Mockup body lumen 48 typically comprises a full-size flexible model of the lumen being simulated. For example, mockup body lumen 48 may be formed from plastic such as polyvinyl chloride (PVC). As described further below, the distal end of the mockup probe is tracked within the mockup lumen. If such tracking is optical, then the flexible model of the lumen being simulated is typically constructed from transparent plastic, such as clear PVC.

During an actual procedure, walls of the lumen constrain the actual probe being used into certain paths. Mockup body lumen 48 applies similar constraints to mockup probe 24.

Mockup patient 26 also comprises haptic technology devices 50 which are configured to apply forces and/or motions to proximal end 40 so as to simulate the resistive force experienced by the operator during an actual procedure with a real probe. The devices typically comprise stepper motors and/or positioning actuators, and are herein also referred to as actuators 50. The applied forces and/or motions generated by the actuators to simulate the resistance are herein termed haptic feedback. Actuators 50 are controlled by system controller 28 providing electrical signals, herein termed feedback signals, to the devices. Typically, actuators 50 are configured to apply a variable frictional force to mockup probe 24 by the actuators applying their force via tube 42 approximately transversely to the mockup probe. The magnitude of the frictional force is set by controller 28. Such a configuration allows operator 22 to move mockup probe 24 into and out of mockup patient 26, after overcoming the frictional force applied by actuators 50.

In some medical procedures, in addition to feeling a resistive force when operating an actual probe, the operator may feel a force, and/or experience movement of the probe, as a consequence of motion by one or more organs of the actual patient undergoing the procedure. Such a force or movement is typically in a direction that is approximately parallel to an axis of the probe. In the case of an actual probe (in a real procedure), an example of such a force or movement is that caused when the distal end contacts a beating wall of the heart, generating a vibratory motion of the probe that is felt at the proximal end. In some embodiments of the present invention, actuators 50 are configured to be able to apply a generally longitudinal force to proximal end 40 in order to simulate this type of force or movement.

In order to implement its simulation, system controller 28 tracks the position of distal end 38, using tracking signals from one or more object tracking devices 52. The tracking is performed at least within mockup body lumen 48, and may typically also be partly outside the lumen. During an actual procedure the distal end of the actual probe is tracked, for example by a magnetic tracking system such as the CARTO system provided by Biosense Webster Inc. of Diamond Bar, Calif. While embodiments of the present invention may use such a tracking system, mutatis mutandis, it is not necessary that distal end 38 is tracked by a system that is normally used in an invasive procedure.

Herein, by way of example, mockup lumen 48 is assumed to be transparent, and tracking devices 52 are assumed to comprise a plurality of generally similar video cameras, also referred to herein as cameras 52, so that distal end 38 is tracked optically. Typically the cameras are positioned within mockup patient 26 so as to image the region corresponding to lumen 48. In some embodiments, lights (not shown in the figure) may also be positioned within mockup patient 26 so as to illuminate distal end 38 when it is within the mockup patient. By way of example, the position of distal end 38 is assumed to be tracked with respect to a set of xyz orthogonal axes defined by edges of mockup patient 26.

Other systems for tracking distal end 38, such as an ultrasonic system, will be familiar to those of ordinary skill in the art, and all such systems and their associated tracking devices are assumed to be comprised within the scope of the present invention.

Figure 2:
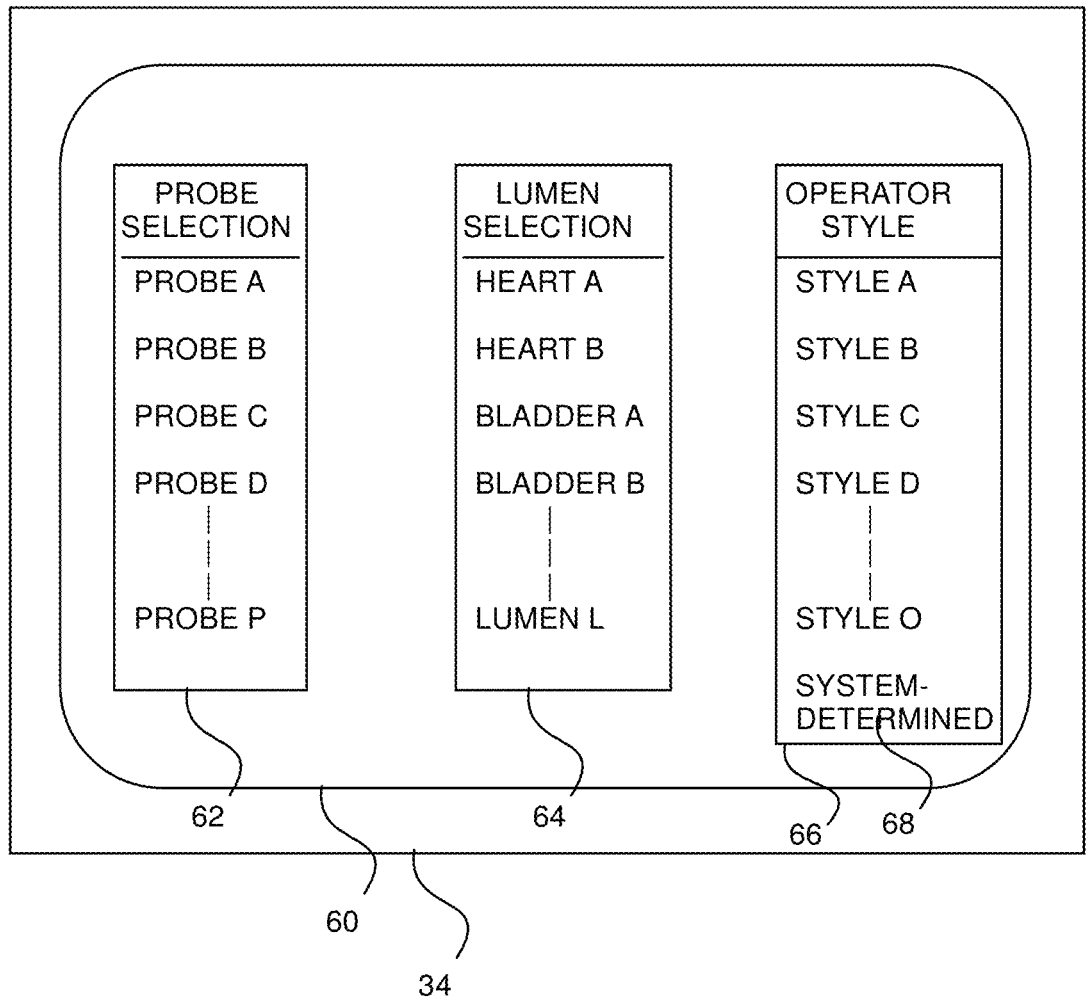
FIG. 2 is a schematic illustration of a set-up screen that is displayed to an operator prior to the operator performing a simulation, according to an embodiment of the present invention.

FIG. 2 is a schematic illustration of a set-up screen 60 that is displayed on GUI 34 to operator 22 prior to the operator performing a simulation, according to an embodiment of the present invention. Screen 60 enables the operator to choose parameters of the simulation. Screen 60 comprises a probe selection region 62 wherein the operator chooses an actual probe to be simulated by mockup probe 24. Typically, region 62 is in the form of a menu from which the operator makes a selection from a multiplicity of actual probes. For example, different ablation probes may have different numbers of electrodes on their distal end, and/or the distal end of the probe may be classified by its shape, such as being a generally "straight" probe or being a "lasso" probe, and/or the probes may have different diameters. However, while there are typically a multiplicity of actual probes, there is typically not a one-to-one correspondence between the actual probes and mockup probes 24A, 24B, . . . , since, as assumed herein, one mockup probe 24 is typically able to simulate a number of actual probes. Consequently, there are usually a small number of mockup probes 24A, 24B, . . . , each being able to simulate different actual probes.

A set of probe meta-data is associated with each actual probe that may be chosen by the operator in region 62, the meta-data describing characteristics of the actual probe, such as a diameter of the actual probe, a length of the actual probe, and one or more parameters descriptive of the actual probe's flexibility. In some embodiments the actual probe may be considered to correspond to a multiplicity of linear rods, connected by joints having known elastic constants, in which case the meta-data comprises dimensions of the rods and the elastic constants. The meta-data typically also includes other parameters which may relate to a function of the actual probe, such as a number of electrodes, and/or an intended use of the probe. As explained in more detail below, system 20 applies some of the meta-data of the chosen actual probe in order to derive a parameter P representative of the effect of the probe during a procedure.

A lumen selection region 64 allows the operator to select a lumen which is to be simulated in operation of system 20. By way of example, the lumens to be simulated in system 20 are assumed to include two types of lumen: a heart and a bladder, although there is substantially no limitation on the number of types of lumens that the system may simulate. (For each type of lumen there is typically a corresponding mockup lumen which may be installed in the mockup patient.) Each selected lumen comprises a respective set of meta-data, typically derived from measurements, such as imaging, on a corresponding actual lumen.

The meta-data associated with a given selected lumen defines a three-dimensional (3D) map of walls of the lumen, as well as characteristics of regions of the walls. The characteristics typically comprise regional wall motions and contractility assessments, so that the meta-data effectively comprises a 3D map of the contractilities.

As is known in the art, contractility may be assessed by a number of tools (e.g. Echocardiography, Angiography, magnetic resonance tagging and catheter-based cardiac mapping analyzing the local trajectory of the catheter-tip during the cardiac cycle). As is also known in the art, the contractility may be measured by different functions based on, for example, a local shortening fraction (which may be linear, circumferential or segmental), an endocardial deformation, a Doppler-based velocity, and a strain and strain-rate analysis. All such assessments and measures of the contractility are assumed to be comprised within the scope of the present invention.

Depending on the lumen, the meta-data may also include other parameters. For example, for the heart, the meta-data may include a periodicity, an amplitude and a direction of motion of regions of the heart wall that are specified on a map of the heart wall.

Each lumen to be simulated is assumed to be classified into two categories: generic and operator-generated. In some embodiments, there may be more than one generic lumen to be simulated, each defining a different characteristic, such as a size and/or a morbidity.

The meta-data for a generic lumen may be generated from data for the lumen that is in the public domain, for example, for a heart data may be found at www.yale.edu/imaging. Such meta-data may comprise results of analysis of a lumen using procedures such as electrocardiography or Doppler imaging. Alternatively or additionally, the meta-data may be generated from other images, such as X-ray or magnetic resonance imaging (MRI) or computerized tomography (CT) images of the lumen; such images may be available to operator 22 but not be in the public domain.

The meta-data for an operator-generated lumen is typically derived from data that has been acquired during non-invasive or invasive procedures previously performed on an actual lumen by the operator, or by an assistant of the operator. For example, a patient may have had a myocardial infarction, and a non-invasive MRI image and/or a non-invasive CT image of her diseased heart may have been made. In addition, an invasive procedure generating a contact-force map of the heart may have been made. The one or more images may be used as a basis, together with the contact-force data of regions of the heart, to generate the meta-data, including a contractility map, of the simulated diseased heart. An exemplary method for determining a contractility map for a lumen is described further below, with reference to flowchart 280 of FIG. 8.

Screen 60 also comprises an operator behavior menu 66. As is known in the medical arts, different operators of actual probes use the probes, even if performing similar actual procedures, with varying styles. For example, one operator may use a probe with a relatively forceful "pushing" motion, while another operator may use the probe with a more gentle "painting" motion. The different motions affect the reaction force felt by the operator during the actual procedure. In many cases, operators are aware of their own style of use of a probe. From behavior menu 66, operator 22 is able to choose from a range of styles. The styles are herein, by way of example, classified from very forceful to very gentle, but any other suitable classification, and corresponding labeling, may be used. Choice of one of the classifications of menu 66 provides controller 28 with a corresponding operator behavior adjustment factor which, as described below, is applied to actuators 50 during a simulation.

Menu 66 also comprises a system-determining entry 68 allowing system 20 to evaluate an effective style of operator 22. Such an entry may be selected by an operator who is unsure of his style, or who desires to check that his style corresponds with a classification of system 20. Selection of this entry allows system 20 to implement a procedure for determining the style of operator 22. The procedure is described further below with respect to FIG. 6.

The probe meta-data and the lumen meta-data are stored in memory 32. On selection of a given probe and a given lumen by the operator using probe selection region 62 and lumen selection region 64, processing unit 30 is able to access both sets of meta-data. From the sets of meta-data, together with the operator behavior adjustment factor determined from menu 66, controller 28 determines haptic feedback to provide to operator 22 during a simulation, as described below in more detail with respect to FIG. 4.

Figure 3:
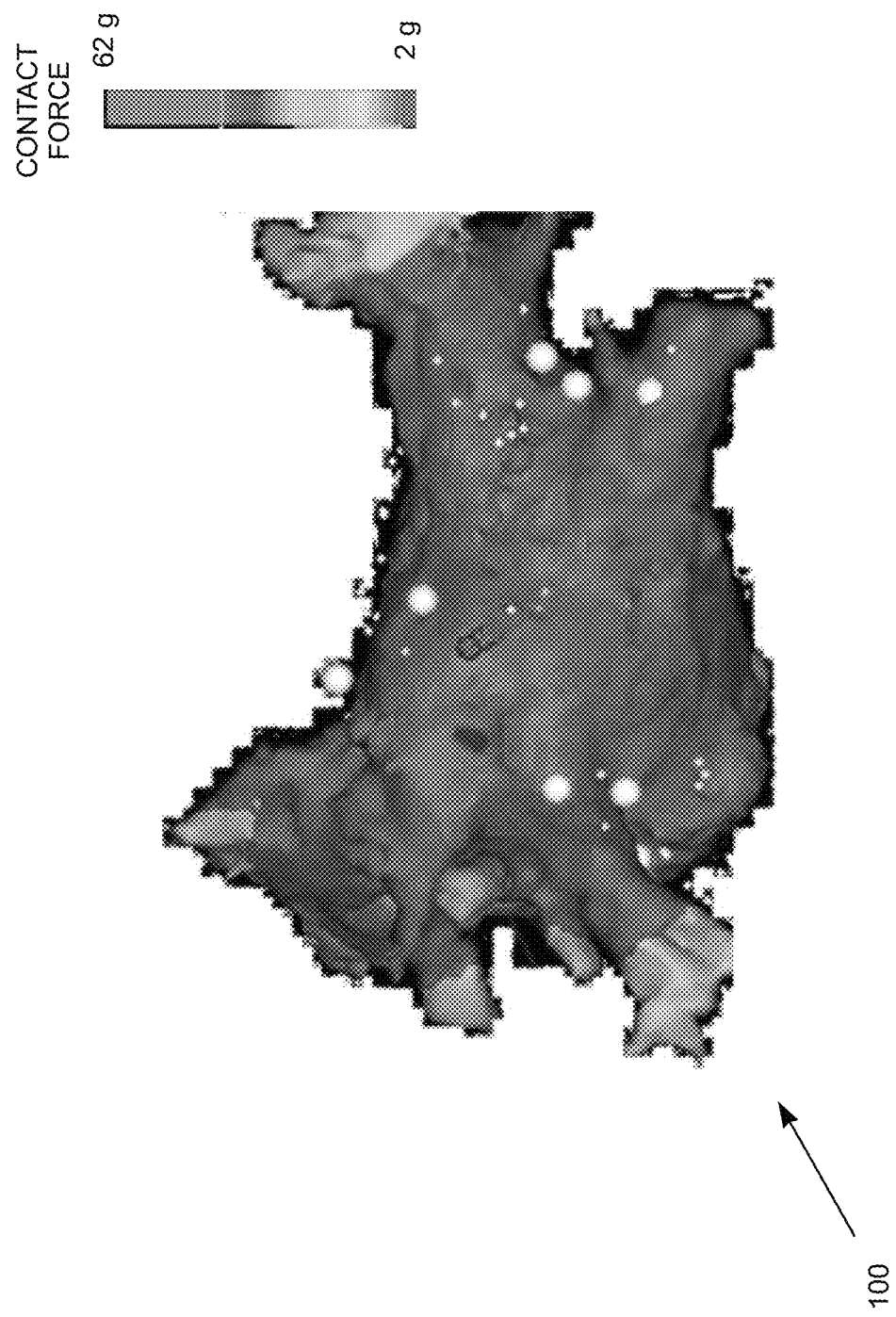
FIG. 3 is a schematic diagram of a contact-force map, according to an embodiment of the present invention.

FIG. 3 is a schematic diagram of a contact-force map 100, according to an embodiment of the present invention. Contact-force map 100 shows, as gray scales in the figure, although typically the map is presented in color, values of contact-forces determined using a probe that has a contact-force measuring device installed in its distal end. Map 100 is the contact-force map determined by a ThermoCool SMART-TOUCH™ probe, produced by Biosense Webster Inc., in a left atrium. The map is typically generated during an actual investigative procedure in the heart. As described below, contact-force maps such as those of map 100 may be used to derive contractilities of regions of the heart.

The contact-force of any particular region of a lumen is a function of the contractility of the region, the probe being used to determine the contact-force, and the characteristic style of the operator using the probe. This relationship may be expressed mathematically as:

$$CF_{xyz} = f(C_{xyz}, P, O) \quad (1)$$

where $CF_{xyz}$ is the contact-force at a region surrounding (x,y,z), $C_{xyz}$ is the contractility of the region, P is the parameter derived from the probe meta-data, O is a parameter representative of the operator style, and f is a function.

During an actual procedure to obtain the contact-forces of equation (1), i.e., the forces on the distal end of an actual probe, the operator experiences a force on the proximal end of the probe which is related to the contact-force. In the simulations performed by embodiments of the present invention, the force applied by actuators 50 is assumed for simplicity, and by way of example, to be linearly related to the contact-force assumed to be present in the simulation. The force applied by actuators 50 is herein termed the haptic feedback force. The above leads to an equation (2):

$$HFF_{xyz} = k \cdot CF_{xyz} = k \cdot f(C_{xyz}, P, O) \quad (2)$$

where $HFF_{xyz}$ is the haptic feedback force when the probe contacts region (x,y,z), and k is a constant.

Returning to equation (1), the equation may be rearranged to give a relationship for the contractility of region (x,y,z):

$$C_{xyz} = g(CF_{xyz}, P, O) \quad (3)$$

where g is a second function

Typically, parameters k, P, and O in equations (1)-(3) may be represented by respective matrices, and functions f and g comprise matrix multiplication. For simplicity, in the description hereinbelow parameters k, P, and O are assumed to be positive real numbers. Also for simplicity, there is assumed to be a linear relation between $CF_{xyz}$, $C_{xyz}$, P, and O. Those having ordinary skill in the art will be able to adapt the description, mutatis mutandis, for the case that the parameters are matrices and/or that the relation is non-linear.

With an appropriate choice of values for P and/or O, equations (2) and (3) may thus be rewritten as:

$$C_{xyz} = CF_{xyz} \Box P \Box O \quad (4)$$

$$HFF_{xyz} = k \Box CF_{xyz} = k \Box \frac{C_{xyz}}{P \Box O} \quad (5)$$

Equation (1) may be similarly rewritten:

$$CF_{xyz} = \frac{C_{xyz}}{P \Box O} \quad (6)$$

Applications of equations (1)-(6) are given below.

Figure 4:
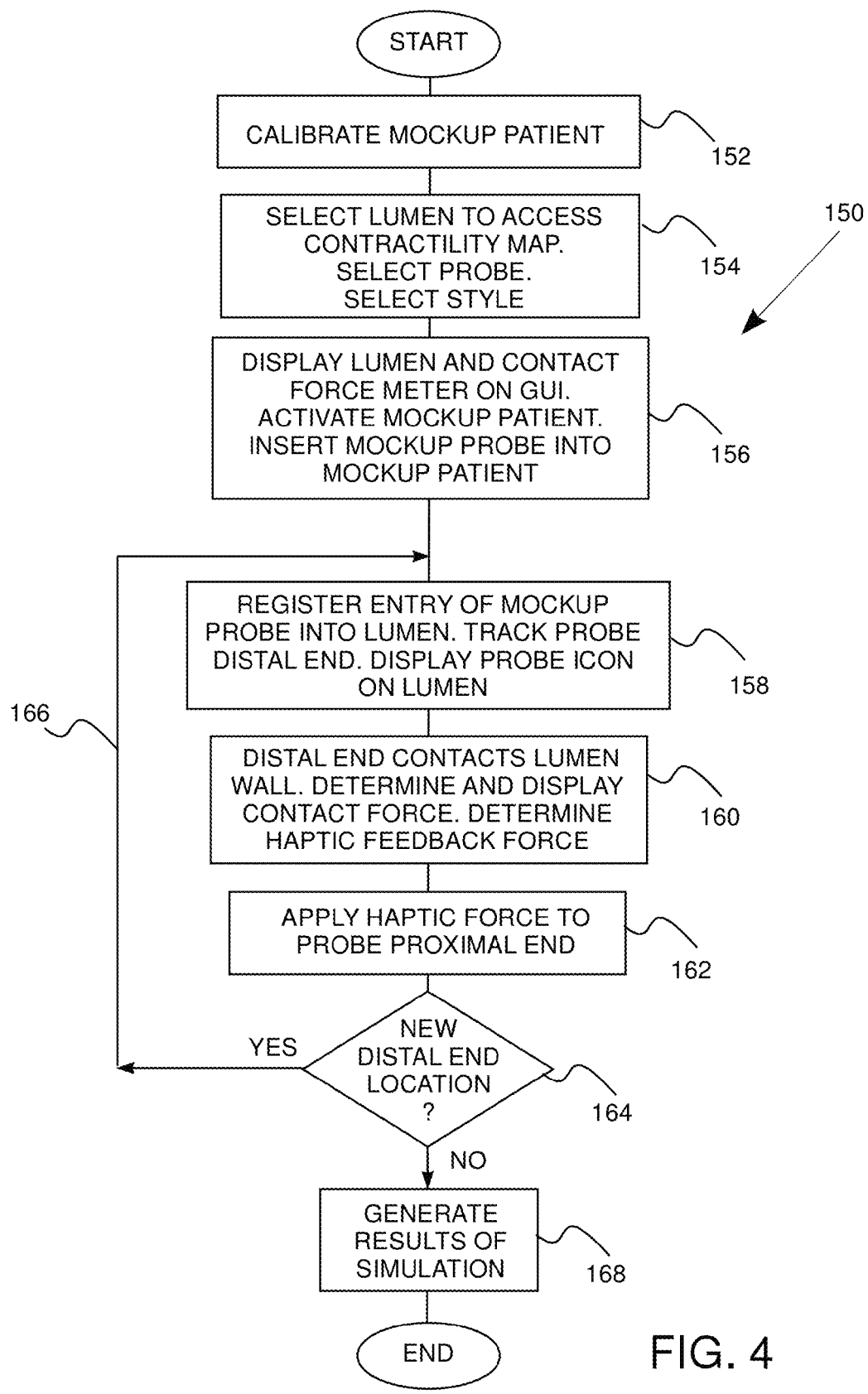
FIG. 4 is a flowchart of steps performed as an operator carries out a simulation in the system of FIG. 1, according to an embodiment of the present invention.
Figure 5:
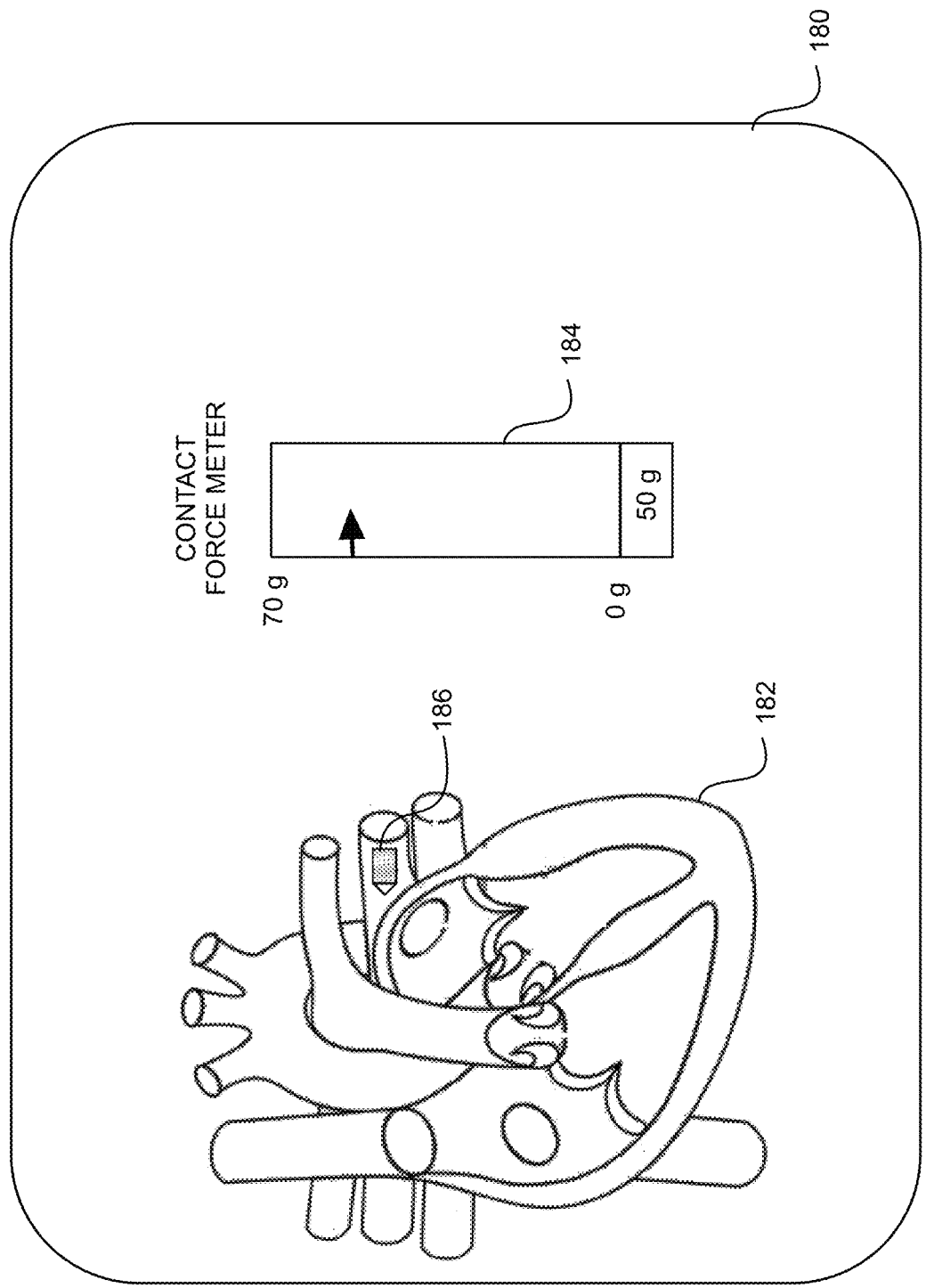
FIG. 5 is a schematic illustration of a screen displayed while steps of the flowchart of FIG. 4 are implemented, according to an embodiment of the present invention.

FIG. 4 is a flowchart 150 of steps performed as operator 22 carries out a simulation in system 20, and FIG. 5 is a schematic illustration of a screen 180 displayed on GUI 34 while steps of the flowchart are implemented, according to embodiments of the present invention. Flowchart 150 assumes that relations similar to equations (4), (5) and (6) above apply.

In a first step 152, performed prior to the operator beginning a simulation, cameras 52 and haptic feedback actuators 50 of mockup patient 26 are calibrated.

The calibration of the cameras allows controller 28 to determine the coordinates in the mockup patient of distal end 38, relative to the mockup patient axes, from images of the distal end formed by the cameras. Typically, the camera calibration is performed by positioning the distal end in known positions in transparent mockup lumen 48, which is positioned in the mockup patient. The cameras generate images of the distal end, and the coordinates of the distal end in the different images are correlated with the known coordinates of the distal end measured relative to the mockup patient axes. Typically, the calibration also includes interpolation and/or extrapolation from the data produced by positioning the distal end in the known positions, so that from the images produced in cameras 52, controller 28 is able to determine the coordinates of distal end 38 when it is anywhere in mockup body lumen 48.

The calibration of actuators 50 allows controller 28 to provide correct haptic feedback, in the form of a force felt by the operator, using equation (5). Typically the force felt for a given motion of actuators 50 is dependent on the diameter of mockup probe 24, so that in the case of mockup probes having different diameters, there is a calibration for each different diameter. For a given diameter mockup probe, the calibration may be performed by inputting known activating signals to the actuators and measuring the resistive frictional force on the mockup probe. This calibration provides a value of the constant k in equation (5), which is typically different for each mockup probe.

In embodiments where actuators 50 are configured to apply a generally longitudinal force to mockup probe 24, as described above, the actuators are calibrated for the longitudinal force in generally the same manner as the calibration for the resistive force. In these embodiments an equation generally similar to equation (5) applies, although typically the constant k is different.

In an initial simulation step 154, screen 60 (FIG. 2) is displayed. The operator chooses a lumen and a probe which are to be simulated, and selects an operator style which is to be used in the simulation. In the following description mockup lumen 48 is assumed to correspond to the type of lumen (e.g., a heart or a bladder) selected by the operator The selection of the probe allows the controller to access the meta-data for the probe and the value of P, and the selection of the operator style allows the controller to access the operator adjustment factor and the value of O.

On selection of the lumen, controller 28 accesses the meta-data of the lumen, thus accessing a 3D map of the lumen, i.e., (x,y,z) values for the lumen, as well as contractility values $C_{xyz}$ (equation (4) for regions surrounding (x,y,z). The controller registers the map and contractility values with the mockup patient axes. In some embodiments, a contact-force map used to generate the contractility map is also accessed.

In a simulation initiation step 156, an image 182 of the selected actual lumen (not mockup lumen 48) and a contact force meter 184 are presented to the operator on GUI 34 (FIG. 5). In addition, cameras 52 are activated. The operator begins a simulation procedure by inserting mockup probe 24 into aperture 46 of the mockup patient. Typically, controller 28 activates actuators 50 to simulate a resistance force that is experienced by an actual probe being inserted into the artery or vein of an actual patient. However, the contact force meter, simulating the contact force felt by distal tip 38, is typically set at zero since at this stage in an actual procedure there is little or no axial force on the distal tip of an actual probe.

In a continuing simulation step 158, the operator continues insertion of the mockup probe until cameras 52 record that the location of distal end 38 is within the bounds of the 3D map of the lumen. At this point, controller 28, together with cameras 52, begins tracking the location of the distal end. Controller 28 uses the measured location to display an icon 186 representing the distal end on screen 180, in correct registration with the image of the selected actual lumen that is already on GUI 34. Operator 22 manipulates proximal end 40 of mockup probe 24 in order to move the distal end to a desired location in image 182.

In a wall contact step 160, controller 28 detects that the location of distal end 38 corresponds to the location of a region of a wall of the lumen (using the 3D map coordinates), so that the distal end is effectively contacting the wall. The contact is also apparent to the operator from the images of the wall and distal end icon 186 generated on screen 180. On contact, the controller accesses the lumen meta-data to determine the contractility of the location of the contact. From the contractility and using equation (6) the controller determines a simulated contact-force at the region of contact, and displays the force on contact force meter 184. The controller uses equation (5) to determine a haptic feedback force to be applied by actuators 50.

In a force application step 162, the controller activates actuators 50 to apply the haptic feedback force determined from equation (5) to proximal end 40. Depending on the meta-data for the selected probe and lumen, the controller may also activate actuators 50 to apply other forces, such as the longitudinal forces described above, to the proximal end. The activation continues as long as the controller, using cameras 52, determines that distal end 38 is in contact with the region determined in step 160.

As shown by a condition step 164, wherein the controller determines if operator 22 has moved distal end 38 to a new location, and by an arrow 166, steps 158, 160, and 162 are repeated until no new locations are registered for the distal end. The simulation described by the flowchart then concludes.

In some embodiments, there is a map presentation step 168. Step 168 may be implemented once the simulation has concluded, or alternatively during the simulation and via a request to controller 28 from the operator. In step 168 the simulated contact-forces determined in step 160 are presented in the form of a simulated contact-force map, generally similar to the map of FIG. 3, on GUI 34. In embodiments where the contact-force map used to generate the contractility map of the lumen has been accessed, this contact-force map may also be displayed for comparison purposes on GUI 34. Inspection of the simulated contact-force map, and/or comparison with the map accessed in step 154, may provide pointers to the operator indicating where too much or too little force may have been exerted, or where the force may not need to be measured.

Figure 6:
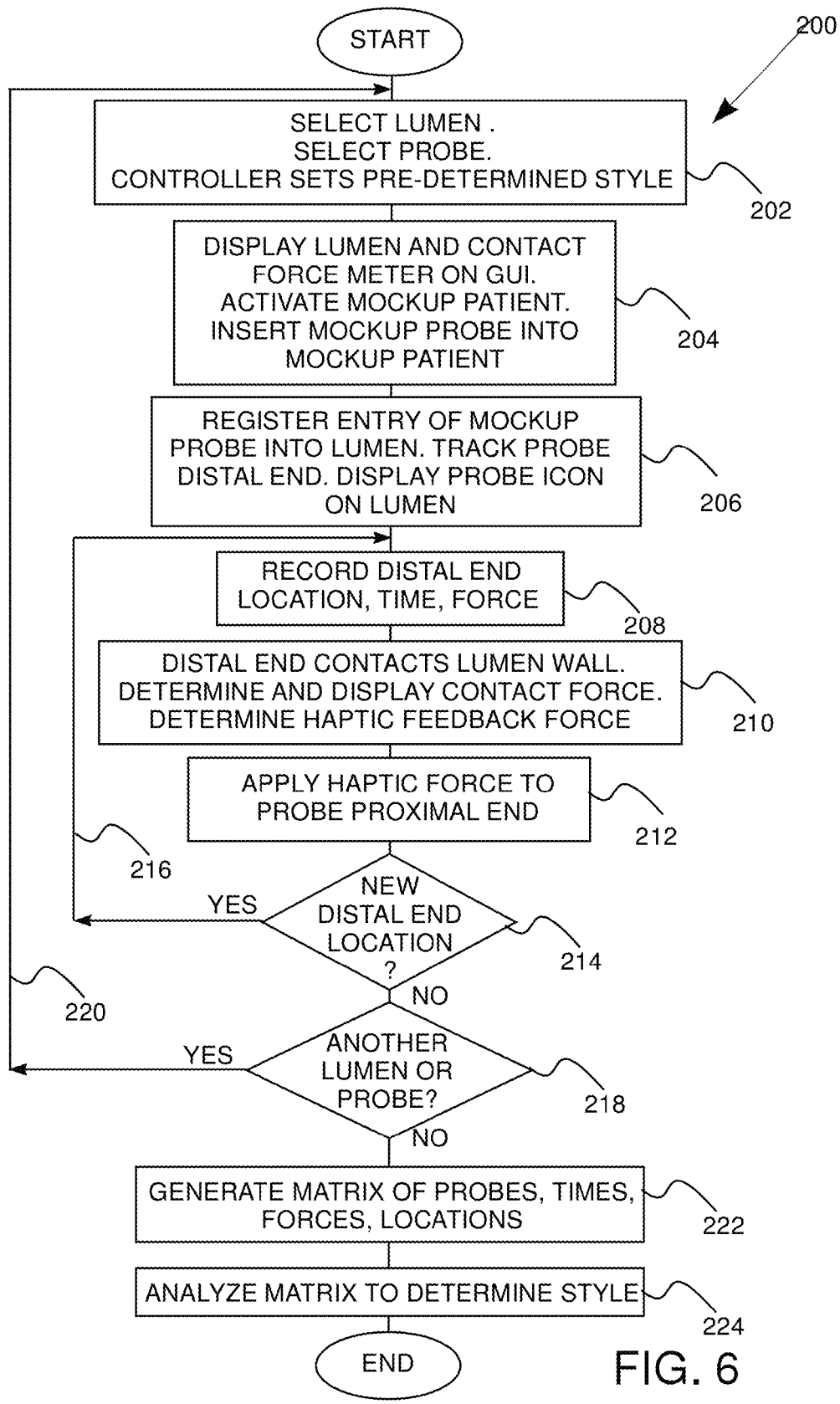
FIG. 6 is a flowchart of steps performed to evaluate a style of an operator, according to an embodiment of the present invention.

FIG. 6 is a flowchart 200 of steps performed to evaluate a style of operator 22, according to an embodiment of the present invention. The steps of the flowchart are typically performed if the operator is unsure of his/her style, and may be accessed by the operator selecting the system-determining entry of menu 66 (FIG. 2).

Flowchart 200 assumes that the cameras and actuators of mockup patient 26 have been calibrated as described for step 152 (flowchart 150).

An initial step 202 is generally similar to step 154 (flowchart 150), so that the operator chooses a lumen and a probe which are to be used in the evaluation. The lumen and the probe are assumed to respectively have a preset contractility map and a probe parameter. Rather than the operator selecting a style, controller 28 assumes a pre-determined value for the style, typically a mean of known operator style values, or a value that is a weighted mean of all possible values of O. Typically, once the lumen and probe have been chosen, an instruction is presented to the operator, on GUI 34, requesting the operator to perform a known procedure, such as an ablation of a region of the left atrium.

First and second evaluation steps 204 and 206 are generally similar, respectively, to simulation initiation step 156 and continuing simulation step 158.

In a recording step 208, once distal end 38 is within the mockup lumen, controller 28 begins recording the location of the distal end, and the times when the distal end is at the location. The recording continues as long as the evaluation of flowchart 200 is being implemented.

Process steps 210, 212 are respectively generally similar to wall contact step 160 and force application step 162 described above. However, in step 210 the value of O assumed in step 202 is used in equations (5) and (6).

A first loop of the flowchart, illustrated by a condition step 214 and an arrow 216, is generally the same as the loop of condition step 164 and arrow 166 of flowchart 150, and continues until the operator stops moving the distal end. If condition step 214 returns negative, then flowchart 200 continues to a second loop, illustrated by a condition step 218 and an arrow 220, to check if the operator wants to select another lumen or probe to be used for the evaluation. For example, the operator may choose to select different types of hearts, which may be "thin," "puffy", or "sportsman-like," and appropriate probes for the different types of heart. If condition 218 returns positive, then the flowchart returns to step 202.

If conditions 214 and 218 both return negative, indicating that operator 22 has concluded providing data on his style of operation, the flowchart continues to final steps 222 and 224 of the flowchart. In a results step 222 controller 28 collates the results generated during the previous steps, typically into one or matrices. In an analysis step 224 the results are analyzed, typically to determine values of parameters such as average force registered, maximum force registered, average speed of motion of the probe, a variation in the speed of motion, and an acceleration and/or a time derivative of the acceleration of the probe. The controller uses the values, typically applying weightings to them, in order to estimate a value of O corresponding to the style of the operator.

Figure 7:
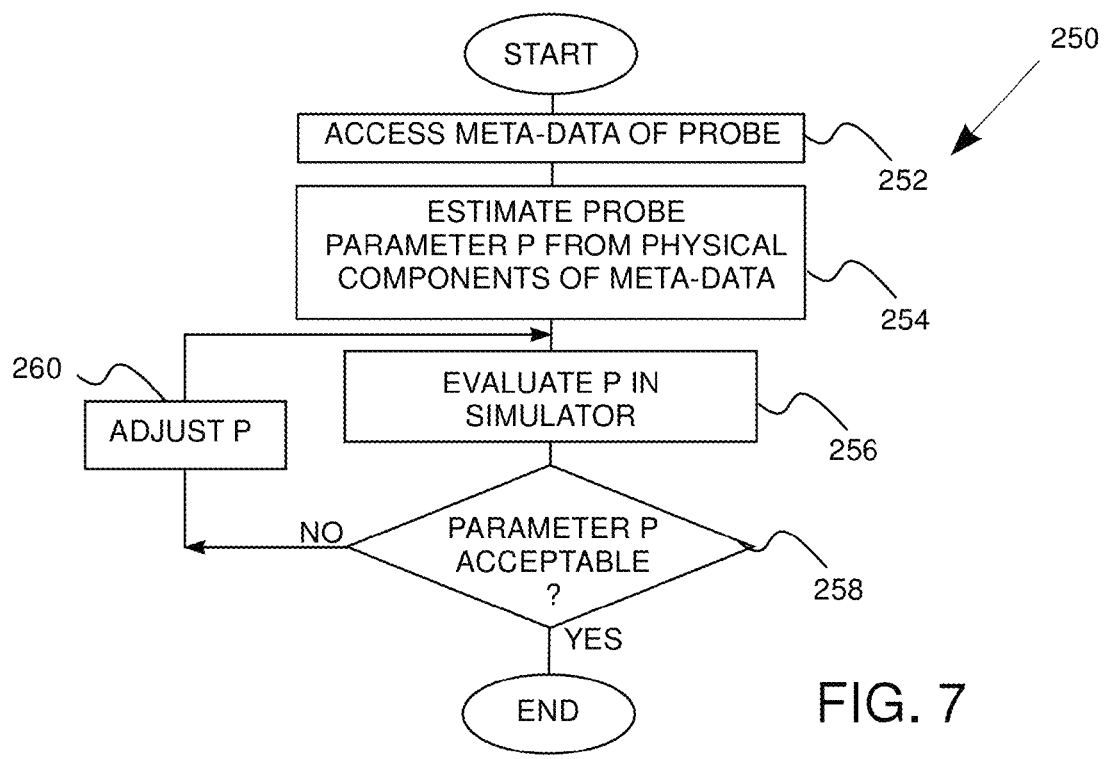
FIG. 7 is a flowchart of steps performed to evaluate a value for a probe parameter of a mockup probe, according to an embodiment of the present invention.

FIG. 7 is a flowchart 250 of steps performed by controller 28 to evaluate a value for parameter P that is applied to a given mockup probe 24, according to an embodiment of the present invention. As explained above, P is typically a function of mechanical characteristics, such as the diameter and flexibility, of the actual probe being simulated by the mockup probe. The procedure of flowchart 250 uses the characteristics of the actual probe to determine a value for P.

In a first step 252, controller 28 accesses the meta-data of the actual probe. The controller isolates mechanical data, such as the length, the diameter, and an elastic constant that measures an ease with which the probe bends, from the meta-data.

In an estimation step 254, the controller estimates a value of P based on the mechanical data. In one embodiment P may be assumed to be inversely proportional to the length, directly proportional to the diameter, and directly proportional to the elastic constant. Alternatively, other dependencies of these mechanical data, and/or of other data, may be assumed in estimating P.

Figure 8:
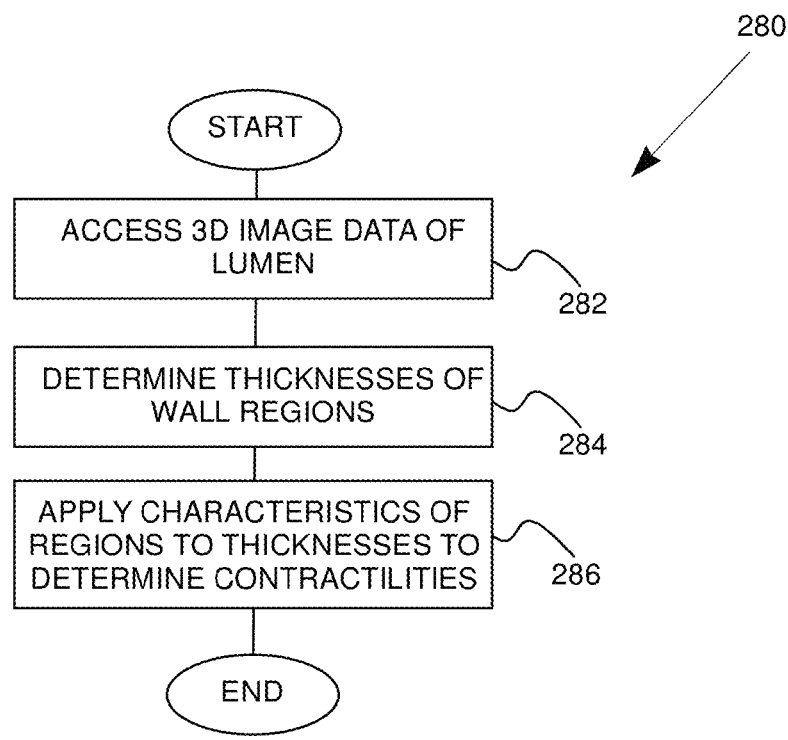
FIG. 8 is a flowchart of steps performed to evaluate contractilities for regions of a given lumen, according to an embodiment of the present invention.

In an evaluation step 256, operator 22 operates system 20, generally according to steps 152-164 of flowchart 150. However, the value of P is from step 254. Typically the lumen selected is one with which the operator is familiar with, and the contractility map for the lumen may be determined according to flowchart 280 (FIG. 8). In the evaluation, the operator estimates if the haptic feedback generated in step 162 of flowchart 150 is acceptable.

In a comparison step 258, the operator indicates if the value of P used in step 256 is acceptable. If it is not acceptable the operator and/or controller 28, in an adjustment step 260, changes the value of P, and the flowchart returns to step 256.

If comparison 259 returns a positive value, the value of P used in the last iteration of step 256 is assumed for the given mockup probe 24 and the selected actual probe, and the flowchart ends.

FIG. 8 is a flowchart 280 of steps performed by controller 28 to evaluate contractilities for regions of a given lumen, according to an embodiment of the present invention. Evaluating the contractilities of the regions corresponds to determining a contractility map for the given lumen.

In a first step 282 the controller accesses 3D image data for the lumen. Typically the image data comprises one or more MRI images, and/or one or more CT images. Alternatively, other imaging data, such as from electrocardiography, Doppler imaging, and/or ultrasound or optical image data may also be used.

In a wall measuring step 284, the controller determines wall thicknesses of different regions of the lumen.

In a contractility determining step 286, the controller determines mechanical characteristics, such as elasticities, of the regions. The regional characteristics of the lumen are typically from data that operator 22 has accessed from public domain sources, such as that referenced above, and stored in memory 32. The data typically comprises pre-acquired echocardiography data and/or magnetic resonance elastography data. Alternatively or additionally, if a contact-force map is available for the lumen, controller 28 may use the contact-force map in its determination of the required mechanical characteristics. For example, a contact-force measurement of an ablated region may provide the controller with a modified value of elasticity of the region, compared to the elasticity value prior to ablation.

From the mechanical characteristics, the controller determines contractilities, $C_{xyz}$, of regions (x,y,z), corresponding to generating the contractility map for the given lumen.

The description above provides independent methods for determining a value of O for the style of an operator, for determining a value of parameter P for a mockup probe simulating a given actual probe, and for determining region contractilities, $C_{xyz}$, corresponding to a contractility map, for a given lumen.

Other methods for determining contractility maps, probe parameters P, and operator styles O will also be apparent to those having ordinary skill in the art, and the maps, parameters and styles may then be used in system 20. Such methods are assumed to be comprised within the scope of the present invention.

For example, sets of contact-force maps on the same or similar organs, that have been obtained with different probes and/or that have been generated by different operators may be compared. Such a comparison, possibly in conjunction with one or more of the methods described with reference to flowcharts 200, 250, and 280, typically generates estimates of contractility maps for the organs. The comparison also typically generates estimates for parameters P of the probes used to acquire the contact-force maps, as well as estimates for styles O of the operators operating the probes.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus, comprising:
a mockup probe having a distal end and a proximal end adapted to be held by a human operator;
a mockup patient, simulating an actual patient, the mockup patient having a mockup organ and an aperture allowing penetration of the distal end of the mockup probe into the mockup patient to contact the mockup organ;
a force generator, coupled to the mockup probe, configured to apply force to the proximal end of the probe that can be felt by the human operator; and
a system controller, which is configured to:
track a location of the distal end of the probe during the penetration thereof into the mockup patient to determine a mockup organ location,
access an indication of a value of contractility of a region of an organ of the actual patient corresponding to the mockup organ contact location,
access an operator parameter indicative of a style of operation of the human operator, and
activate the force generator so that the force applied to the proximal end of the probe is responsive to the value of contractility and the operator parameter.

2. The apparatus according to claim 1,
wherein the system controller is configured to access a probe parameter indicative of a mechanical property of an actual probe which is simulated by the mockup probe, and wherein the force applied to the proximal end is responsive to the probe parameter.

3. The apparatus according to claim 2,
wherein a value of the probe parameter is determined in response to an evaluation of the force felt by the human operator.

4. The apparatus according to claim 1,
wherein the operator parameter is determined in response to a recording of the location of the distal end of the probe and a time at the location, of a plurality of mockup contact locations.

5. The apparatus according to claim 1,
wherein the system controller is configured to determine the value of contractility in response to analysis of a contact-force map of the organ displayed on an image of the organ.

6. The apparatus according to claim 5,
wherein the contact-force map is produced using an actual probe comprising a force sensor.

7. The apparatus according to claim 5,
wherein the image is produced using a non-invasive imaging of the organ.

8. The apparatus according to claim 1,
wherein the mockup probe is configured to simulate an actual probe having an actual-probe distal end and comprising a force sensor at the actual-probe distal end.

9. The apparatus according to claim 1,
and comprising one or more tracking devices which transmit distal end tracking signals to the system controller in response to the location of the distal end.

10. A method, comprising:
providing a mockup probe, having a distal end and a proximal end adapted to be held by a human operator;
simulating an actual patient with a mockup patient, the mockup patient having a mockup organ and an aperture allowing penetration of the distal end of the mockup probe into the mockup patient to contact the mockup organ;
coupling the force generator to the mockup probe so as to apply force to the proximal end of the probe that can be felt by the human operator; and
tracking a location of the distal end of the probe during the penetration thereof into the mockup patient to determine a mockup organ contact location;
accessing a value of contractility of a region of an organ of the actual patient corresponding to the mockup organ contact location,
accessing an operator parameter indicative of a style of operation of the human operator; and
activating the force generator so that the force applied to the proximal end of the probe is responsive to the value of contractility and the operator parameter.

11. The method according to claim 10,
further comprising accessing a probe parameter indicative of a mechanical property of an actual probe which is simulated by the mockup probe, and wherein the force applied to the proximal end is responsive to the probe parameter.

12. The method according to claim 11, further comprising determining a value of the probe parameter in response to an evaluation of the force felt by the human operator.

13. The method according to claim 10, wherein the operator parameter is determined in response to a recording of the location of the distal end of the probe, and a time at the location, of a plurality of mockup organ contact locations.

14. The method according to claim 10, further comprising determining the value of contractility in response to analyzing a contact-force map of the organ displayed on an image of the organ.

15. The method according to claim 14, wherein the contact-force map is produced using an actual probe comprising a force sensor.

16. The method according to claim 14, wherein the image is produced using a non-invasive imaging of the organ.

17. The method according to claim 10, wherein the mockup probe is configured to simulate an actual probe having an actual-probe distal end and comprising a force sensor at the actual-probe distal end.

18. The method according to claim 10, further comprising one or more tracking devices which transmit distal end tracking signals to the system controller in response to the location of the distal end.

19. The method of claim 10, wherein the tracking comprises displaying on a graphical display the location of the distal end of the probe on a 3D map of the organ.

20. The method of claim 14, further comprising determining the value of contractility as a function of a contact force of the organ, the probe parameter and the operator parameter.

21. The method of claim 20, further including calibrating the mockup patient to determine a calibration value based on the location of the mockup organ in the mockup patient.

22. The method of claim 21, wherein the force applied to the proximal end of the probe is a function of the value of contractility and the calibration value.

23. The method of claim 19 further comprising displaying a contact force meter on the graphical display to display the force applied to the proximal end of the probe.

24. The method of claim 19 further comprising tracking the distal end of the probe at a plurality of mockup contact locations and generating a simulated contact force map of the organ based on the force applied to the proximal end of the probe at each location.

25. The apparatus of claim 1, wherein the tracking comprises displaying on a graphical display the location of the distal end of the probe on a 3D map of the organ.

26. The apparatus of claim 5, wherein the system controller is further configured to determine the value of contractility as a function of a contact force of the organ, the probe parameter and the operator parameter.

27. The apparatus of claim 26, wherein the system controller is further configured to calibrate the mockup patient to determine a calibration value based on the location of the mockup organ in the mockup patient.

28. The apparatus of claim 27, wherein the force applied to the proximal end of the probe is a function of the value of contractility and the calibration value.

29. The apparatus of claim 25 wherein the system controller is further configured to display a contact force meter on the graphical display to display the force applied to the proximal end of the probe.

30. The apparatus of claim 25 wherein the system controller is further configured to track the distal end of the probe at a plurality of mockup contact locations and generate a simulated contact force map of the organ based on the force applied to the proximal end of the probe at each location.

* * * * *